8957X
G. Page,
Wood Chisel.
Patented July 7, 1835.
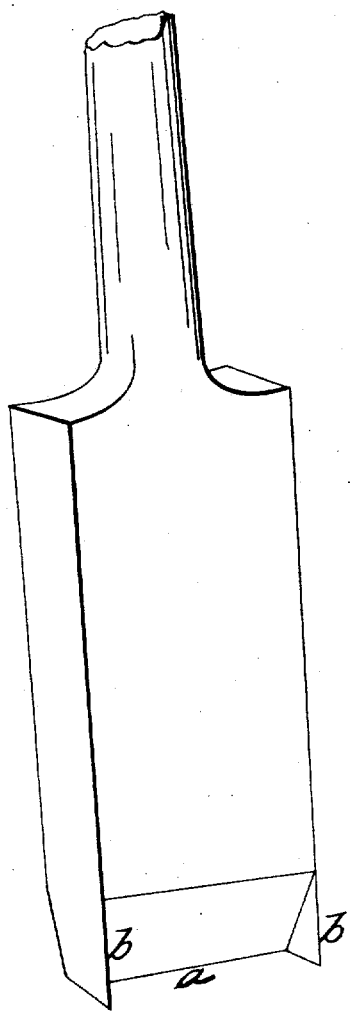
AM. PHOTO-LITHO. CO. N.Y. (OSBORNE'S PROCESS)

George Page of Keene New Hampshire

Letters Patent

The Schedule referred to in these Letters Patent and making part of the same containing a description in the words of the said George Page him self of his improvement in the common chisel.

To all to whom these presents shall come: Be it known that I George Page of Keene in the County of Cheshire and State of New Hampshire have invented a new and useful improvement in the common Chisel, which improved chisel is called the improved cutting and clearing chisel: — and that the following is a full and exact description of the construction and and operation of the said machine as invented by me.

The main part of the improved cutting and clearing chisel is made like that of the common chisel. The shank is sometimes made shorter, round diminishing slightly towards the top but not pointed; and is so made that it may be inserted in an iron socket, and sometimes it is made like that of a common chisel. At the cutting end, it has a main edge & two side edges or wings. The face is straight like that of a common chisel. The back at the end is bevelled or gradually rounded to an edge, on the back at each of the narrow sides it has wing or side edge. These are not more than one sixteenth of an inch thick; and in all cases as thin as may be compatible, with the requisite strength. Their width is from two five sixteenths of an inch according to the size of the chisel, for soft wood wider than for hard. and they extend up the chisel about half an inch. At the bottom these wings have a sharp cutting edge which trims the sides of the mortise. The edges are formed by bevelling inside but most at and near the angles, and by bevelling outside but most at and near the corners. These corners are not square but a little rounded. At the upper end the wings are slanted towards the main part of the chisel. They are slightly bevelled on the outside but not to an edge except at the bottom. This chisel is intended to be used principally in mortising machines but may be used as the common chisel is used. — The best cast steel should be used in

[illegible]

510.

8957X matters therein. We claim only the wings or side edges as my invention

Witnesses: Alan Holman, Elm C. Hatch

George Page (429 Words)

(Patented July 7. 1835.)